United States Patent
Terai et al.

(10) Patent No.: US 10,434,934 B2
(45) Date of Patent: Oct. 8, 2019

(54) HIGH MOUNT STOP LAMP FOR AUTOMOBILE

(71) Applicants: KABUSHIKI KAISHA TOYOTA JIDOSHOKKI, Kariya-shi, Aichi-ken (JP); KOITO MANUFACTURING CO., LTD., Tokyo (JP)

(72) Inventors: Hideaki Terai, Kariya (JP); Kazumasa Okumura, Kariya (JP); Yuichi Mizutani, Kariya (JP); Kazutami Oishi, Shizuoka (JP); Koji Uchino, Shizuoka (JP); Masaki Agemi, Kariya (JP)

(73) Assignees: KABUSHIKI KAISHA TOYOTA JIDOSHOKKI, Kariya-shi, Aichi-ken (JP); KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 15/554,928

(22) PCT Filed: Feb. 29, 2016

(86) PCT No.: PCT/JP2016/056131
§ 371 (c)(1),
(2) Date: Aug. 31, 2017

(87) PCT Pub. No.: WO2016/143588
PCT Pub. Date: Sep. 15, 2016

(65) Prior Publication Data
US 2018/0050633 A1    Feb. 22, 2018

(30) Foreign Application Priority Data

Mar. 6, 2015  (JP) .................. 2015-044482
May 19, 2015  (JP) .................. 2015-101876

(51) Int. Cl.
*B60Q 1/44* (2006.01)
*F21S 43/00* (2018.01)
(Continued)

(52) U.S. Cl.
CPC ............ *B60Q 1/44* (2013.01); *B60Q 1/302* (2013.01); *F21S 43/00* (2018.01); *F21S 43/14* (2018.01);
(Continued)

(58) Field of Classification Search
CPC .. B60Q 1/44; B60Q 1/302; F21S 48/00; F21S 43/249; F21S 43/14; F21S 43/27;
(Continued)

(56) References Cited

U.S. PATENT DOCUMENTS 6,767,120 B2  7/2004  Ohtsuka et al.
8,974,101 B2  3/2015  Koizumi
(Continued)

FOREIGN PATENT DOCUMENTS

CN        104048236 A       9/2014
DE    10 2014 204 415 A1    9/2014
(Continued)

OTHER PUBLICATIONS

International Search Report for PCT/JP2016/056131 dated May 31, 2016 [PCT/ISA/210].
(Continued)

*Primary Examiner* — Anh T Mai
*Assistant Examiner* — Hana S Featherly
(74) *Attorney, Agent, or Firm* — Sughrue Mion, PLLC

(57) ABSTRACT

A high mount stop lamp mounted on a rear portion of a roof of an automobile is provided. The high mount stop lamp includes a flat light guide arranged below a resin roof panel. The light guide includes a front end and a rear end. The high mount stop lamp also includes a light source opposing the
(Continued)

front end of the light guide. The rear end of the light guide is located on or proximate to a rear end of the roof panel to function as a light emitting portion.

8 Claims, 5 Drawing Sheets

(51) Int. Cl.
*B60Q 1/30* (2006.01)
*F21S 43/14* (2018.01)
*F21S 43/15* (2018.01)
*F21S 43/27* (2018.01)
*F21S 43/239* (2018.01)
*F21S 43/243* (2018.01)
*F21S 43/249* (2018.01)

(52) U.S. Cl.
CPC ............. *F21S 43/15* (2018.01); *F21S 43/239* (2018.01); *F21S 43/243* (2018.01); *F21S 43/249* (2018.01); *F21S 43/27* (2018.01)

(58) Field of Classification Search
CPC ........ F21S 43/243; F21S 43/00; F21S 43/239; F21S 43/15
USPC .......................................................... 362/493
See application file for complete search history.

(56) References Cited

U.S. PATENT DOCUMENTS

| 2003/0086276 | A1 | 5/2003 | Ohtsuka et al. |
| 2012/0104790 | A1* | 5/2012 | Plavetich ............... B60Q 1/268 296/146.16 |
| 2013/0021815 | A1 | 1/2013 | Koizumi |
| 2013/0250607 | A1* | 9/2013 | Schmuck ............. G02B 6/0035 362/602 |
| 2014/0003075 | A1* | 1/2014 | Yamada ............... B60Q 1/0035 362/511 |
| 2014/0254186 | A1 | 9/2014 | Terai et al. |

FOREIGN PATENT DOCUMENTS

| JP | 2003-141909 A | 5/2003 |
| JP | 2009-220700 A | 10/2009 |
| JP | 2013-26008 A | 2/2013 |
| JP | 2014-175199 A | 9/2014 |

OTHER PUBLICATIONS

International Preliminary Report on Patentability dated Sep. 12, 2017 in counterpart international application No. PCT/JP2016/056131.
Communication dated Mar. 26, 2019 issued by the State Intellectual Property Office of People's Republic of China in counterpart application No. 201680013033.7.
Communication dated Oct. 11, 2018 from the German Patent Office in Application No. 11 2016 001 066.4.

* cited by examiner

HIGH MOUNT STOP LAMP FOR AUTOMOBILE

CROSS REFERENCE TO RELATED APPLICATIONS

This application is a National Stage of International Application No. PCT/JP2016/056131, filed on Feb. 29, 2016, which claims priority from Japanese Patent Application No. 2015-044482, filed on Mar. 6, 2015, and Japanese Patent Application No. 2015-101876, filed on May 19, 2015, the contents of all of which are incorporated herein by reference in their entirety.

TECHNICAL FIELD

The present invention relates to a stop lamp mounted on a rear portion of an automobile.

BACKGROUND ART

Patent document 1 discloses a high mount stop lamp mounted on a rear portion of a roof of, for example, a sedan-type automobile. The high mount stop lamp emits light toward the rear. Patent document 1 discloses a technique for supporting the high mount stop lamp with an inner member formed from a steel plate and coupled to a hemmed portion of a rear end of a roof panel. This allows the high mount stop lamp to be located between the rear end of the roof panel and a front end (upper end) of a back window glass while ensuring sufficient coupling strength.

PRIOR ART DOCUMENT

Patent Document

Patent Document 1: Japanese Laid-Open Patent Publication No. 2009-220700

SUMMARY OF THE INVENTION

Problems that are to be Solved by the Invention

In the high mount stop lamp of patent document 1, light sources are arranged between a rear end of a roof and the upper end of the back window glass. This enlarges a step between the rear end of the roof and the upper end of the back window glass. As a result, it is difficult for the automobile to have a flush surface. This lowers the aerodynamic characteristics when a vehicle is traveling. Further, in the high mount stop lamp of patent document 1, a light emitting lens is arranged between the rear end of the roof and the upper end of the back window glass while ensuring the waterproof property. This forms a gap between the roof and the back window glass and lowers the aesthetic appeal. Further, this increases the number of components and the cost.

It is an object of the present invention to provide a high mount stop lamp that increases the aerodynamic characteristics by reducing a step between a rear end of a roof and a back window glass and eliminates a gap between the roof and the back window glass in order to reduce the cost.

Means for Solving the Problem

A high mount stop lamp that solves the above problem is mounted on a rear portion of a roof of an automobile. The high mount stop lamp includes a flat light guide arranged below a resin roof panel. The light guide includes a front end and a rear end. The high mount stop lamp also includes a light source opposing the front end of the light guide. The rear end of the light guide is located on or proximate to a rear end of the roof panel to function as a light emitting portion.

EMBODIMENTS OF THE INVENTION

Figure 1:
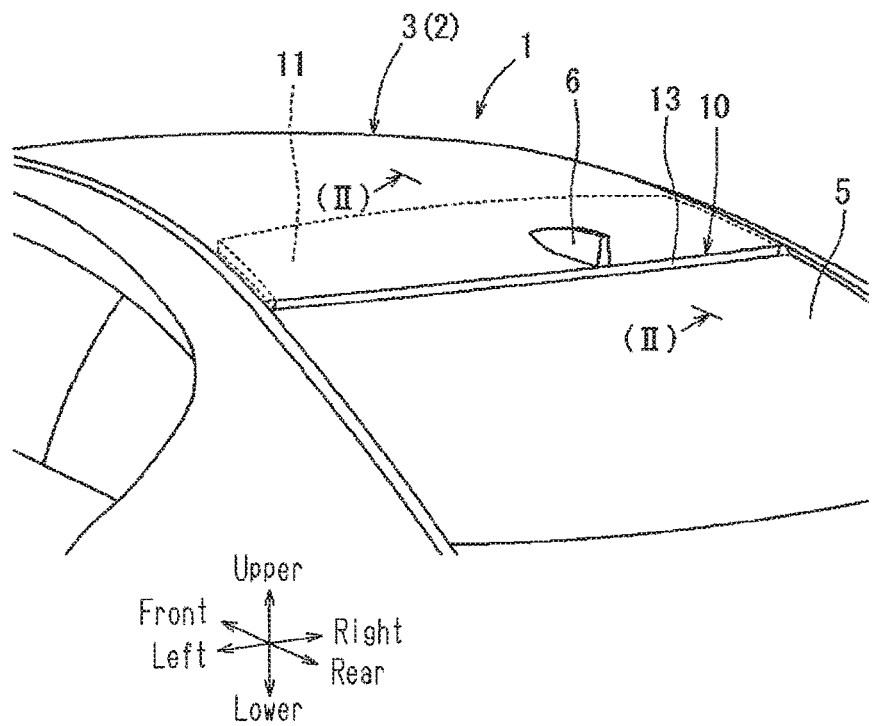
FIG. 1 is a perspective view showing a rear portion of a roof of a vehicle.

A first embodiment of the present invention will now be described with reference to the drawings. As shown in FIG. 1, a high mount stop lamp 10 of the first embodiment is mounted along a rear end of a roof 2 of a vehicle 1. A transparent or translucent roof panel formed from a resin (resin roof panel 3) is used for the roof 2 to reduce the weight of the roof 2. In the first embodiment, the resin roof panel 3 is used for substantially the entire region of the roof 2. A back window glass 5 is mounted on the rear of the roof 2. An antenna 6, which has the form of a shark fin, is mounted on a central portion in a vehicle widthwise direction in an upper surface of a rear portion of the roof 2.

Figure 2:
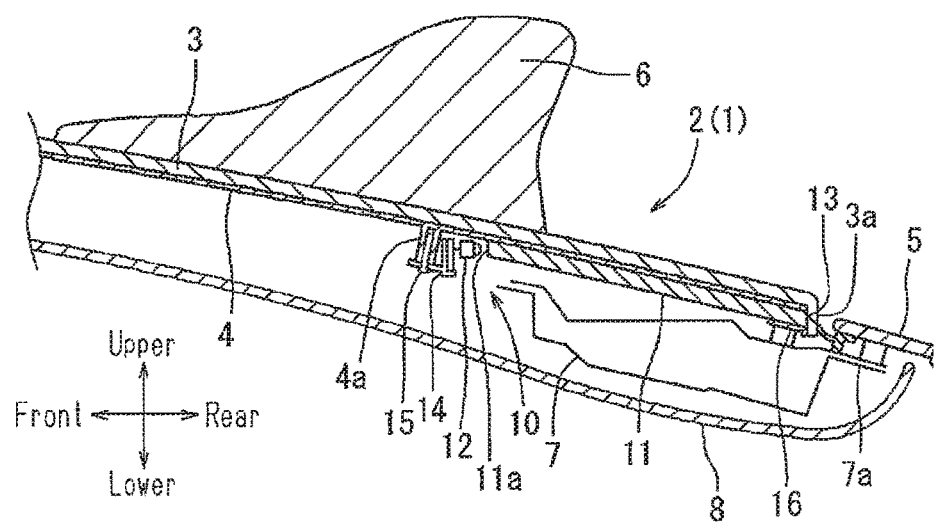
FIG. 2 is a cross-sectional view showing a first embodiment of a high mount stop lamp and the rear portion of the roof taken along line II-II in FIG. 1.

As shown in FIG. 2, a light blocking layer 4 (black ceramic layer), which is formed from a black resin, is stacked on a lower surface of the resin roof panel 3. In the first embodiment, the light blocking layer 4 is stacked on substantially the entire region of the lower surface (vehicle inner side surface) of the resin roof panel 3. The light blocking layer 4 opacifies the resin roof panel 3. In this regard, the passenger compartment is not visible through the roof panel in the same manner as a roof panel formed from a steel plate. The light blocking layer 4 and the resin roof panel 3 are formed through two-color molding. As long as the light blocking layer is opaque, the light blocking layer is not limited to black and may be in another color.

The high mount stop lamp 10 of the first embodiment is mounted along a lower surface of the rear portion of the resin roof panel 3. The high mount stop lamp 10 includes a light guide 11 and light sources 12. As shown by the broken line in FIG. 1, the light guide 11 has a flat shape over substantially the entire length of the resin roof panel 3 in the widthwise direction along the lower surface of the rear portion of the resin roof panel 3. The light guide 11 is a thin plate having a thickness of several millimeters and formed from a transparent polycarbonate resin. The light guide 11 is insert-molded when molding the resin roof panel 3 and arranged integrally with the resin roof panel 3. Thus, the rear portion of the roof 2 has a three-layer structure of the resin roof panel 3, the light blocking layer 4, and the light guide 11. As shown in FIG. 2, an upper surface of the light guide 11 is covered by the light blocking layer 4. Thus, the light guide 11 is not visible from above the resin roof panel 3. Further, the light blocking layer 4 restricts the leakage of light from the upper surface of the light guide 11.

As shown in FIG. 2, a rear end of the resin roof panel 3 is downwardly bent in an L-shape with a small vertical width over substantially the entire width in the widthwise direction. A rear end surface (light emitting portion 13) of the light guide 11 is abutted against and fixed to an inner surface (front surface) of the rear end bent portion 3a. The light emitting portion 13 of the light guide 11 is located along a maximally upper portion of the rear end bent portion 3a. The rear end of the light guide 11, that is, the light emitting portion 13, emits light over substantially the entire width in the widthwise direction so that the high mount stop lamp 10 emits thin light in a belt-like manner over substantially the entire width in the widthwise direction (line light emission).

The light guide 11 extends frontward from the rear end of the roof 2 to the proximity of a portion immediately below the antenna 6. The light source 12 opposes a front end surface 11a of the light guide 11. A plurality of light sources 12 are arranged at intervals in the widthwise direction. Light emitting diodes (LEDs) are used as the light sources 12. The light sources 12 are coupled to a light source support bracket 14 extending in the widthwise direction and arranged in a line in the widthwise direction. Screw through holes extend through the light source support bracket 14 at intervals in the widthwise direction. A tubular light source holding portion 4a is molded integrally with the light blocking layer 4. A plurality of light source holding portions 4a are arranged in correspondence with the screw holes of the light source support bracket 14. A screw 15 inserted through each screw hole of the light source support bracket 14 is fastened to the corresponding light source holding portion 4a so that the light source support bracket 14 is fixed to the lower surface of the resin roof panel 3.

The light sources 12 emit light rearward from the light emitting portion 13 through the light guide 11 in the widthwise direction with substantially the same brightness. As shown in FIG. 2, an auxiliary light blocking layer 16, which is formed from a black resin, is stacked on a lower surface of a rear portion of the light guide 11. The auxiliary light blocking layer 16 is stacked not only on the lower surface of the rear portion of the light guide 11 but also on two side surfaces of the light guide 11. The auxiliary light blocking layer 16 is stacked on the light guide 11 through two-color molding when the light guide 11 is insert-molded. The light blocking layer 4 and the auxiliary light blocking layer 16, which are black resin layers that block light, block the entire surroundings of the light emitting portion 13, that is, the upper and lower surfaces and the two side surfaces of the light guide 11, from light. Thus, the light source 12 emits light from the light emitting portion 13 without being leaked to the surroundings.

A rear header 7 is arranged below the light guide 11. The rear header 7 is a reinforcement member formed from a steel plate. The rear header 7 is extended in the widthwise direction and coupled to left and right roof side rails. The light guide 11 is located in a small space between the rear header 7 and the resin roof panel 3. The rear header 7 and the resin roof panel 3 are covered by a headlining 8 from below.

As shown in FIG. 2, a front portion of the light guide 11 projects frontward from a front end of the rear header 7 slightly. Thus, the light sources 12 are located at positions deviated frontward from the front end of the rear header 7. Accordingly, when the headlining 8 is removed, maintenance work such as exchange of the light sources 12 can easily be performed without being interfered with by the rear header 7.

The rear header 7 includes a rear portion 7a protruding rearward from the rear end bent portion 3a of the resin roof panel 3. An upper end (front end) of the back window glass 5 is placed on an upper surface of the rear portion 7a of the rear header 7. A lower surface of the auxiliary light blocking layer 16 and an upper surface of the rear header 7 are connected to each other by an adhesive so that the rear header 7 supports the rear portion of the resin roof panel 3.

In the high mount stop lamp 10 of the first embodiment, the light of the light sources 12 is emitted from the rear end (light emitting portion 13) of the light guide 11. The rear end of the light guide 11 is located on the rear end bent portion 3a of the resin roof panel 3 (rear end of roof 2, that is, rear end of resin roof panel 3). Further, the light sources 12 are located frontward from the light guide 11. Thus, only the light emitting portion 13 of the light guide 11 needs to be located on the rear end of the roof 2, and the light sources 12 are arranged at a portion separated frontward from the rear end of the roof 2 by the length of the light guide 11. Thus, the vertical width of the space that accommodates the rear end (light emitting portion 13) of the light guide 11 is greatly reduced as compared to a conventional structure in which the entire high mount stop lamp including light sources is arranged at a rear end of a roof. This greatly reduces the step between the rear end of the roof 2 and the back window glass 5 (for example, several millimeters) and increases the aerodynamic characteristics of a vehicle.

The reduction of the step between the rear end of the roof 2 and the back window glass 5 reduces or eliminates the gap between the rear end of the roof 2 and the back window glass 5 to improve the aesthetic appeal of a parting portion of the roof 2.

The light emitting portion 13 of the light guide 11 is covered by the rear end (rear end bent portion 3a) of the roof 2. This ensures the waterproof property. The rear end of the light guide 11 that functions as the light emitting portion 13 is arranged at the rear end of the roof 2, and the light sources 12 are located frontward from the light guide 11. Thus, the number of components is reduced as compared to the conventional structure in which the waterproof property needs to be ensured for the entire high mount stop lamp including light sources. This allows for cost reduction.

The light guide 11 is arranged along the lower surface of the resin roof panel 3 and molded integrally with the resin roof panel 3. Thus, when the resin roof panel 3 is molded, the light guide 11 is integrated with the resin roof panel 3 through insert-molding. This simplifies the assembling process and decreases the weight of the vehicle as compared to a structure using a separate coupling member.

The light source holding portion 4a that supports the light source support bracket 14, which supports the light sources 12, on the lower surface of the resin roof panel 3 is molded integrally with the light blocking layer 4. Thus, the number of components is reduced as compared to a structure in which a light holding portion is coupled to a light blocking layer as a separate component. This reduces the cost and improves the assembling efficiency.

The light guide 11, the light sources 12, and the light source support bracket 14 are arranged below the light blocking layer 4, which blocks light. Thus, the light guide 11, the light sources 12, and the light source support bracket 14 are not visible from the outside. This improves the aesthetic appeal of the rear portion of the roof.

The light blocking layer 4 or the auxiliary light blocking layer 16 covers the entire surroundings of the light emitting portion 13, that is, the upper and lower surfaces and the two side surfaces of the light guide 11. This restricts the leakage of light from the light sources 12 to the surroundings.

The light sources 12 are arranged at a portion separated frontward from the light emitting portion 13 by the length of the light guide 11. This reduces unevenness of light emission (unevenness at bright portions and dark portions) of the light emitting portion 13 as compared to the conventional structure. Thus, the number of the light sources 12 is reduced while allowing the light emitting portion 13 to evenly emit light. This allows for cost reduction. In this regard, in the conventional structure in which light sources are arranged at the rear end of the roof, intense lighting portions exist in correspondence with positions of the light sources that are arranged in the widthwise direction. Thus, it is difficult to evenly emit light in the widthwise direction. In the first embodiment, a suitable distance is obtained between the light sources 12 and the light emitting portion 13 (rear portion of roof). Thus, light is evenly emitted without unevenness of brightness.

Figure 3:
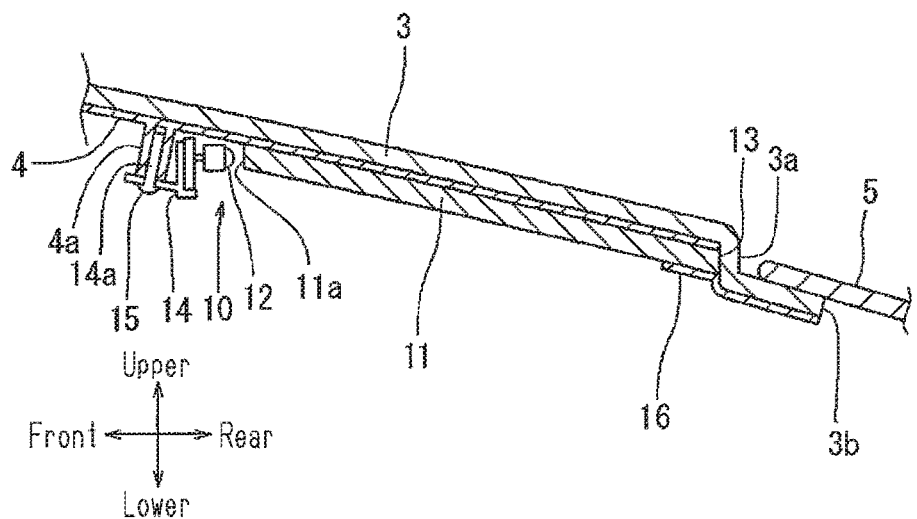
FIG. 3 is a cross-sectional view showing a second embodiment of a high mount stop lamp and its surroundings.

Various modifications may be made to the above embodiment. For example, as shown in FIG. 3, in a second embodiment, the rear end of the resin roof panel 3 includes a receiving flange 3b that is one level lower than other portions of the resin roof panel 3. Further, a vertical wall, which serves as a wall surface, extending in the widthwise direction and forming a step is arranged between the receiving flange 3b and the remaining portion of the resin roof panel 3. The receiving flange 3b receives the upper end (front end) of the back window glass 5. The light emitting portion 13 of the light guide 11 is located along the vertical wall (corresponding to rear end bent portion 3a), which forms a step. Like or same reference numerals are given to members and structures that do not need to be changed. Such members and structures will not be described. This structure reduces the coupling tolerance or unevenness of the resin roof panel 3 and the back window glass 5 mainly in the vertical direction. This allows the position of the light emitting portion 13 relative to the upper end of the back window glass 5 in the vertical direction to be further even in the widthwise direction. The position of an upper surface of the rear end of the roof 2 relative to an upper surface of the upper end of the back window glass 5 in the vertical direction is further even in the widthwise direction. This further reduces the step between the upper surface of the rear end of the roof 2 and the upper surface of the upper end of the back window glass 5 and achieves clean line light emission with a further thin width. Consequently, the aesthetic appeal and visibility of the high mount stop lamp 10 further increases.

Figure 4:
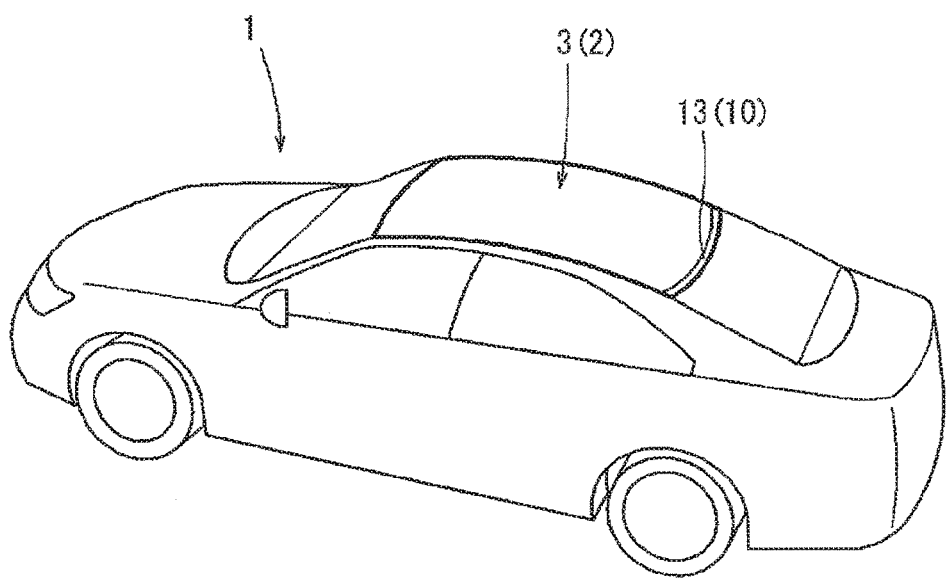
FIG. 4 is a perspective view showing a vehicle in which the entire roof is a resin roof.
Figure 5:
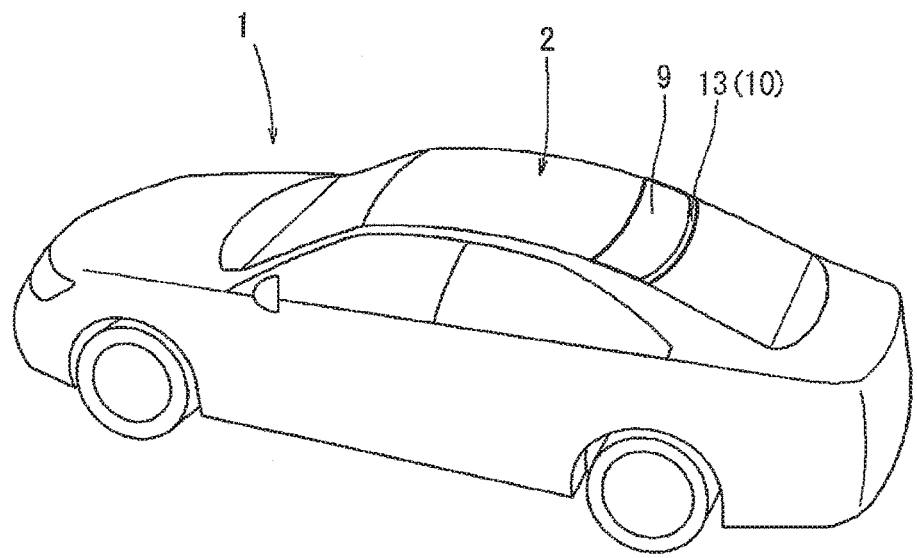
FIG. 5 is a perspective view showing a vehicle in which the roof of a rear side is a resin roof.

The high mount stop lamp 10 is applicable to a vehicle 1 that uses the resin roof panel 3 for the entire region of the roof 2 as shown in FIG. 4. In the same manner, the high mount stop lamp 10 is applicable to, for example, a vehicle 1 that uses a resin roof panel 9 for a region of the rear portion of the roof 2 having a certain width as shown in FIG. 5. In this case, the light blocking layer 4 formed from a black resin material may be stacked on the entire surface of the resin roof panel 3 or 9. Alternatively, the light blocking layer 4 may be omitted from some regions, and the high mount stop lamp 10 may be formed by only the resin roof panel 3 or 9 that is transparent or translucent.

In the above example, the light guide 11 is integrated with the resin roof panel 3 or 9 through insert-molding. Instead, a light guide that has been manufactured in advance in a different process may be, for example, adhered to or fastened by screws to the lower surface of the resin roof panel.

In the above example, the light blocking layer 4 is stacked on the transparent resin roof panel. Instead, the roof panel may be molded from a non-transparent resin so that the roof panel functions to block light. In this case, the light guide 11 (of light emitting portion 13) is exposed from the rear end of the roof panel to ensure the rear visibility. The light guide 11 may be coupled to the roof panel through insert-molding. Alternatively, the light guide 11 may be inserted into a slit arranged in the roof panel and coupled to the roof panel.

In the above example, the light guide is molded integrally with the resin roof panel 3, and the light guide manufactured as a separate component is coupled to the lower surface of the resin roof panel. However, when the light guide is a component separate from the resin roof panel, the resin portion does not necessarily have to contact and be coupled to the resin roof panel as described below and may be spaced apart from the resin roof panel.

Figure 6:
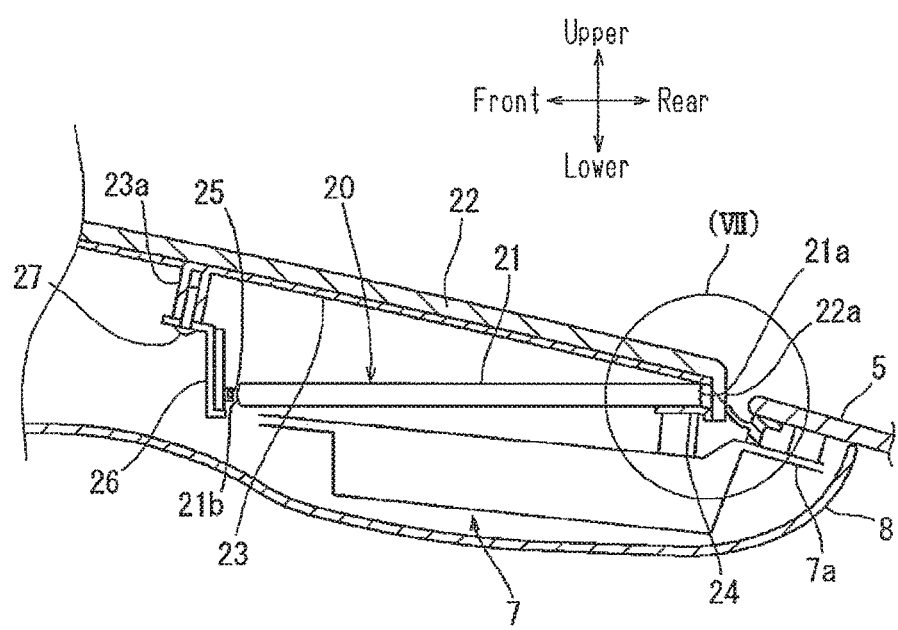
FIG. 6 is a cross-sectional view showing a third embodiment of a high mount stop lamp and its surroundings.

FIG. 6 shows a third embodiment of a high mount stop lamp 20. In the first and second embodiments, the light guide 11 is molded integrally with the lower surface of the resin roof panel 3. The third embodiment differs from the first and second embodiments in that a light guide 21 is manufactured as a member separate from a resin roof panel 22 and that the light guide 21 is located at a position separated from the resin roof panel 22. In the same manner as the first and second embodiments, a light blocking layer 23 formed from a black resin is stacked on substantially the entire region of a lower surface of the resin roof panel 22. Like or same reference numerals are given to those structures and members that are the same as the corresponding structures and members of the first and second embodiments. Such structures and members will not be described in detail.

A rear end of the resin roof panel 22 is downwardly bent in an L-shape with a small vertical width over substantially the entire width in the widthwise direction. A rear end (light emitting portion 21a) of the light guide 21 opposes an inner surface (front surface) of the rear end bent portion 22a.

In the third embodiment, the light guide 21 is arranged below the resin roof panel 22. In the same manner as the first and second embodiments, the light guide 21 is molded from a transparent polycarbonate resin and has a flat shape having a thickness of several millimeters over substantially the entire length of the resin roof panel 22 in the widthwise direction. An auxiliary light blocking layer 24, which is formed from a black resin, is stacked on a lower surface of the light guide 21 in the proximity of the light emitting portion 21a. The auxiliary light blocking layer 24 protrudes frontward in a horizontal manner from a lower portion of the inner surface of the rear end bent portion 22a. The rear end of the light guide 21 is placed on and supported by an upper surface of the auxiliary light blocking layer 24. The light blocking layer 23, which is located at the upper side, and the auxiliary light blocking layer 24, which is located at the lower side, block upper and lower sides of the light emitting portion 21a from light. This allows the light emitting portion 21a to efficiently emit light rearward.

The resin roof panel 3 supports the light guide 21 with a light guide holding portion (not shown) arranged at the light blocking layer 23. The light guide 21 is elongated frontward in a horizontal manner. A front end of the light guide 21 protrudes in a manner that is substantially the same as the front end of the rear header 7 or slightly frontward from the front end of the rear header 7. The front end of the light guide 21 functions as a light entrance portion 21b. Light sources 25 are arranged at the front of the light entrance portion 21b. In the same manner as the first and second embodiments, the light sources 25 are supported by a light source support bracket 26 and arranged at intervals in a line in the widthwise direction. The light source support bracket 26 is fixed to a light source holding portion 23a of the light blocking layer 23 by a screw 27. The entire high mount stop lamp 20, the rear header 7, and the resin roof panel 3 are covered by the headlining 8 from below. An upper portion of the back window glass 5 is placed on the rear portion 7a of the rear header 7 by an adhesive.

In the high mount stop lamp 20 of the third embodiment, the light sources 25 are separated frontward from the rear end of the roof by the length of the light guide 21. Thus, as compared to the conventional structure in which the entire high mount stop lamp 20 is arranged on the rear end of the roof, the structure of the surroundings of the light emitting portion 21a is simplified to reduce the step in the proximity of the rear end of the roof. This increases the aerodynamic characteristics of the vehicle.

In particular, in the third embodiment, the light guide 21 is a component separate from the resin roof panel 22. Thus, space can easily be defined between the resin roof panel 22 and the light guide 21. Such a space can be used to accommodate a control substrate or the like that forms the high mount stop lamp 20 or other members. This increases the degree of freedom for the arrangement of the members such as the control substrate. Subsequently, the structure of the high mount stop lamp becomes compact.

Figure 7:
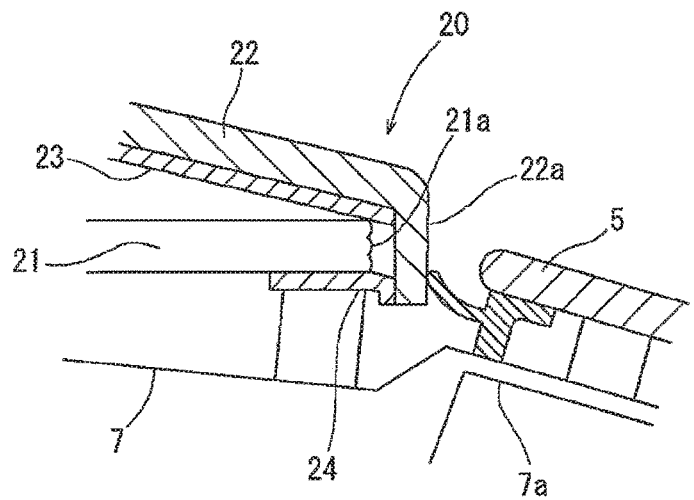
FIG. 7 is an enlarged view of encircled portion VII in FIG. 6 showing a light emitting portion and its surroundings.

Since the light guide 21 is separate from the resin roof panel 22, the degree of freedom for the shape of the light emitting portion 21a increases. As shown in FIG. 7, in the third embodiment, the light emitting portion 21a has a shape (fisheye step) in which projections each having an oval-shaped cross section are arranged in three lines in the vertical direction. Surface treatment is performed on the light emitting portion 21a to refract (diffuse) light in a plurality of directions. The light emitting portion 21a having such a shape emits light further evenly. In the third embodiment, the light blocking layer 23 reduces the visibility of the light emitting portion 21a through the roof. This improves the aesthetic appeal in the same manner as the first and second embodiments.

Further, in the structure in which the light guide 21 is not molded integrally with the resin roof panel 22, the thickness of the resin roof panel 22 can be set to be constant. This avoids problems such as formation of molding sink marks and increases the degree of freedom of design for a molding die. Consequently, the moldability of the resin roof panel 22 increases. When the light guide 21 and the resin roof panel 22 are integrally molded, the molding die is removed in complicated directions. Further, deformation, molding sink marks, and the like of the light guide 21 and the light emitting portion 21a (step) need to be taken into account. This increases the cost of the molding die. However, separate manufacturing (molding) of the light guide 21 and the resin roof panel 22 overcomes these problems and allows for cost reduction.

Figure 8:
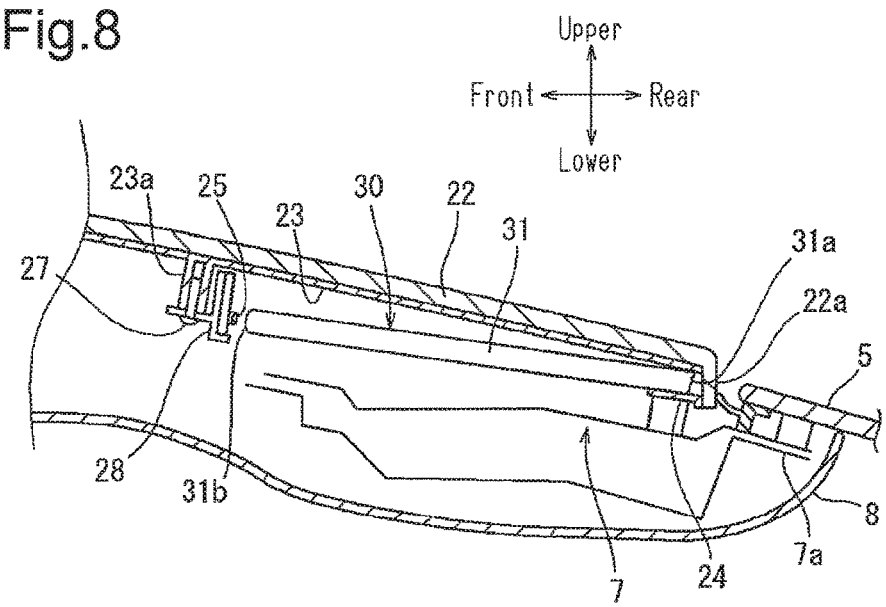
FIG. 8 is a cross-sectional view showing a fourth embodiment of a high mount stop lamp and its surroundings.

FIG. 8 shows a fourth embodiment of a high mount stop lamp 30. The fourth embodiment is the same as the third embodiment in that a light guide 31 is a component separate from the resin roof panel 22. However, the fourth embodiment differs from the third embodiment in the position of the light guide 31. Like or same reference numerals are given to those structures and members that are the same as the corresponding structures and members of the third embodiment. Such structures and members will not be described in detail. The light guide 31 of the fourth embodiment is arranged below the resin roof panel 22. In the fourth embodiment, the light guide 31 is downwardly inclined toward a rear end of the light guide 31. This differs from the third embodiment, in which the light guide 21 is arranged in a horizontal manner. Further, the light guide 31 of the fourth embodiment is inclined with respect to the resin roof panel 22.

The light guide 31 of the fourth embodiment includes a light emitting portion 31a having the form of a fisheye step in the same manner as the third embodiment. The light emitting portion 31a has a shape in which projections each having an oval-shaped cross section are arranged in three lines in the vertical direction along a surface inclined with respect to the thickness-wise direction. The light emitting portion 31a is inclined frontward as the lower side becomes closer. Thus, the light emitting portion 31a is inclined so that the light emitting portion 31a is separated from the rear end bent portion 22a, which is arranged in a vertical manner, and extends frontward as the light emitting portion 31a extends downward.

The light sources 25 of the fourth embodiment, which are arranged in the widthwise direction and opposed to the light entrance portion 31b of the light guide 31, are supported by a light source support bracket 28, which differs from the light source support bracket 26 of the third embodiment. In the fourth embodiment, the light source support bracket 28 is fixed to the light source holding portion 23a by the screw 27.

The light of the light source 25 that enters the light entrance portion 31b of the light guide 31 is emitted from the light emitting portion 31a in a direction that is slightly refracted toward the upper side. As a result, the light enters at right angles to the rear end bent portion 22a and is irradiated rearward in a horizontal manner. This ensures the visibility from the rear.

In the high mount stop lamp 30 of the fourth embodiment, the light guide 31 is inclined in an orientation that is neither horizontal nor parallel to the resin roof panel 22. Thus, for example, when the distance between the rear header 7 and the resin roof panel 22 is shorter than that of the third embodiment as shown in FIG. 8 and when the light guide 31 cannot be arranged in a horizontal manner frontward from the rear end bent portion 22a, the light guide 31 can efficiently be arranged.

In the high mount stop lamp 10 (20, 30), light of the light sources 12 (25) is eventually irradiated rearward from the rear end bent portion 3a (22a) of the resin roof panel 3 (22) in a horizontal manner. This ensures the visibility from the rear. In this manner, when the angle of the light emitting portion is set in a suitable manner by the orientation (inclined state) of the light guide, the direction of the light irradiated rearward from the light emitting portion can be set in the horizontal direction or in a certain direction regardless of the orientation of the light guide.

Figure 9:
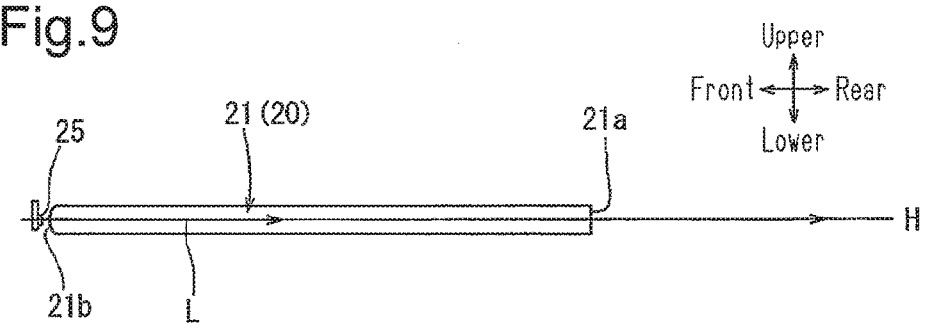
FIG. 9 is a side view of a third embodiment of a light guide showing the relationship of an angle of a light emitting portion and an irradiating direction of light.
Figure 10:
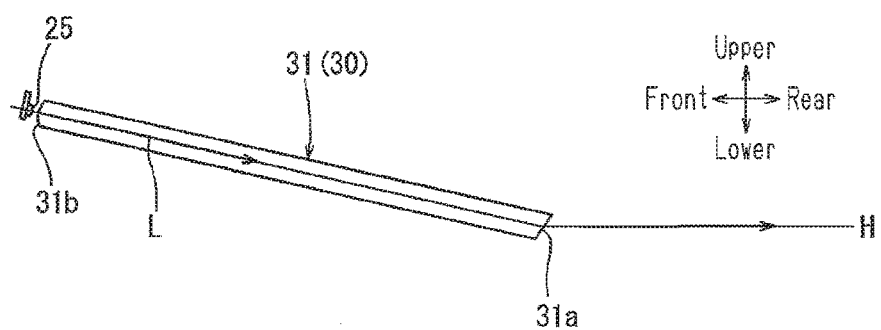
FIG. 10 is a side view of a fourth embodiment of a light guide showing the relationship of an angle of a light emitting portion and an irradiating direction of light.

FIGS. 9 and 10 show the relationship of the angle of the light emitting portion and the irradiating direction of light. FIG. 9 shows the light guide 21 of the third embodiment. As described above, the light guide 21 of the third embodiment is arranged below the resin roof panel 22 in a horizontal manner. Thus, an optical axis L of the light guide 21 coincides with a horizontal axis H, and the light emitting portion 21*a* is arranged in a direction orthogonal to the optical axis L. In this case, the light emitted from the light emitting portion 21*a* is directed in the same direction as the optical axis L and irradiated rearward in a horizontal manner. This ensures the visibility from the rear.

FIG. 10 shows the light guide 31 of the fourth embodiment. As described above, the front side of the light guide 31 of the fourth embodiment is inclined toward the upper side with respect to the horizontal axis H. Thus, the optical axis L of the light guide 31 intersects the horizontal axis H. The light emitting portion 31*a* of the light guide 31 of the fourth embodiment is inclined frontward as the lower side becomes closer. Accordingly, the light emitted from the light emitting portion 31*a* is irradiated in the direction intersecting the optical axis L. As a result, the light is irradiated from the light emitting portion 31*a* in a horizontal manner. This ensures the visibility from the rear.

Figure 11:
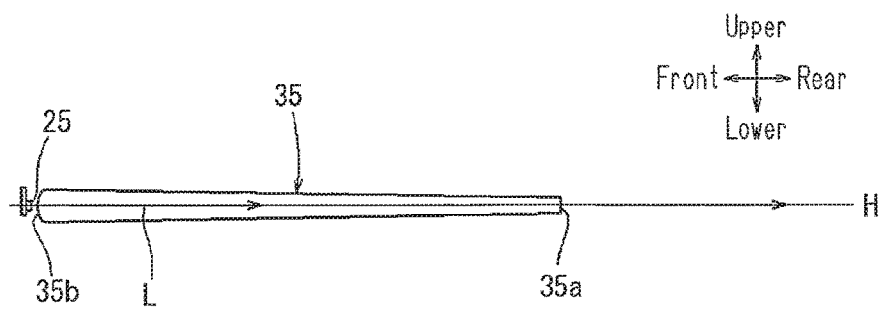
FIG. 11 is a side view showing another embodiment of a light guide.

The light guide may be further modified. For example, as shown in FIG. 11, a light guide 35 that changes in thickness may be used. As shown in FIG. 11, the light guide 35 gradually decreases in thickness toward the rear, that is, toward a light emitting portion 35*a*. The thickness of a light entrance portion 35*b*, which is located at the front side, is increased so that the light of the light sources 25 enters the light entrance portion 35*b* more efficiently. Further, the thickness of the light emitting portion 35*a*, which is located at the rear side, is decreased so that light further concentrates and is clearly irradiated rearward. This further improves the visibility from the rear.

The invention claimed is:

1. A high mount stop lamp mounted on a rear portion of a roof of an automobile, the high mount stop lamp comprising:
    a flat light guide arranged below a resin roof panel, wherein the light guide includes a front end and a rear end; and
    a light source opposing the front end of the light guide, wherein
    the rear end of the light guide is located on or proximate to a rear end of the roof panel to function as a light emitting portion so that light emitted from the light emitting portion is irradiated rearward of the automobile and directed to an exterior of the vehicle to ensure a visibility from a rear of the automobile,
    the light guide has a flat shape and is elongated frontward from the rear end,
    the light guide is arranged along a lower surface of the roof panel, and
    the roof panel includes a transparent portion covering the rear end of the light guide.

2. The high mount stop lamp according to claim 1, wherein the light guide is formed integrally with the roof panel.

3. The high mount stop lamp according to claim 1, wherein the light guide is a component separate from the roof panel and spaced apart from the roof panel.

4. The high mount stop lamp according to claim 1, wherein
    the light guide is located between the roof panel and a rear header extending in a widthwise direction along a rear portion of the lower surface of the roof panel, and
    the front end of the light guide is located frontward from a front end of the rear header.

5. The high mount stop lamp according to claim 1, wherein
    the roof panel has transparency.

6. The high mount stop lamp according to claim 1, wherein a vehicle inner portion of the roof panel excluding a portion of the roof panel that covers the rear end of the light guide includes an opaque light blocking layer.

7. The high mount stop lamp according to claim 6, wherein the light blocking layer includes a light source holding portion that holds the light source.

8. The high mount stop lamp according to claim 1, wherein
    the rear end of the roof panel includes a receiving flange that is one level lower than other portions of the rear end of the roof panel,
    a wall surface extending in the widthwise direction and forming a step is arranged between the receiving flange and a remaining portion of the roof panel, and
    an upper end of a back window glass is arranged on the receiving flange, and the rear end of the light guide is arranged along the wall surface.

\* \* \* \* \*